July 10, 1928.
H. S. VINCENT
1,676,509
LOCOMOTIVE BOOSTER APPARATUS
Filed May 25, 1923    2 Sheets-Sheet 1
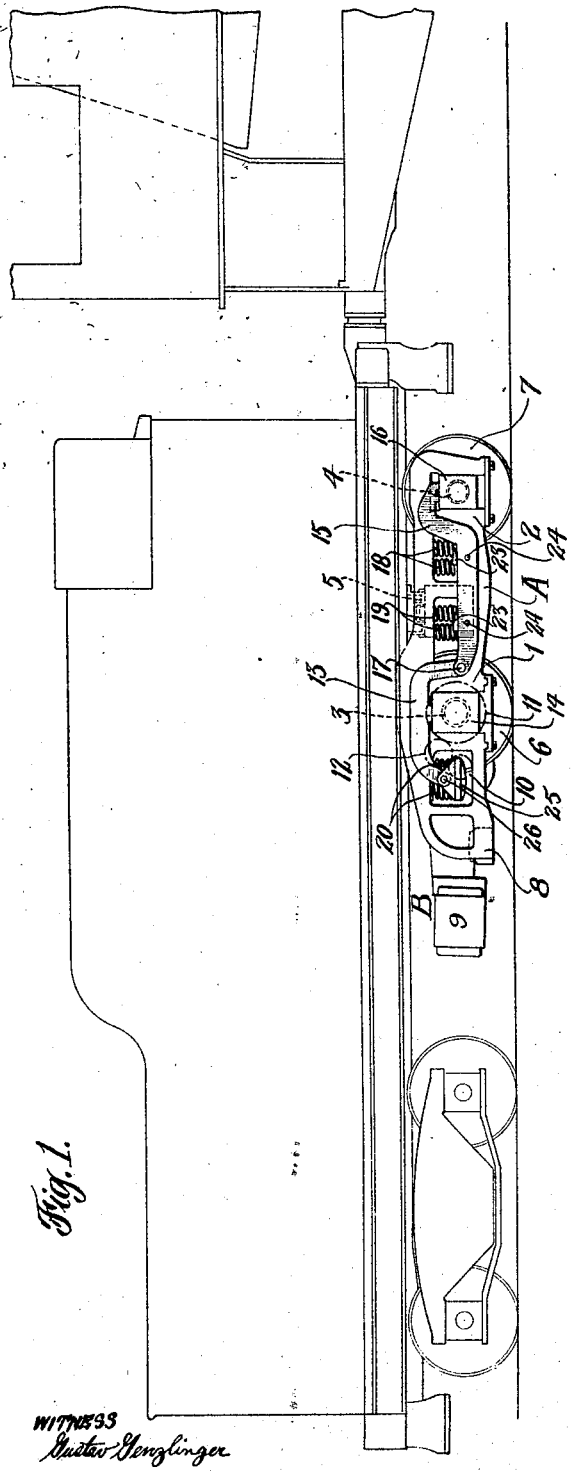
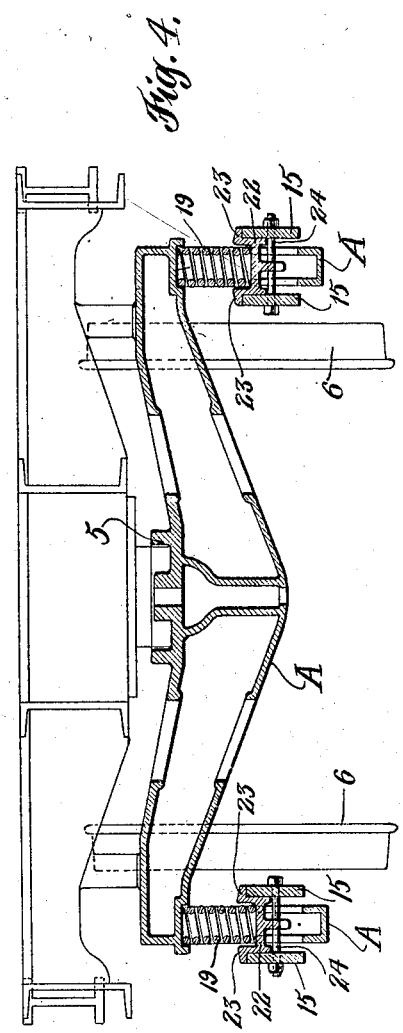
INVENTOR
Harry S. Vincent
BY
Synnestvedt & Lechner
ATTORNEYS
WITNESS
Gustav Genzlinger July 10, 1928.  
H. S. VINCENT  
LOCOMOTIVE BOOSTER APPARATUS  
Filed May 25, 1923  
1,676,509  
2 Sheets-Sheet 2
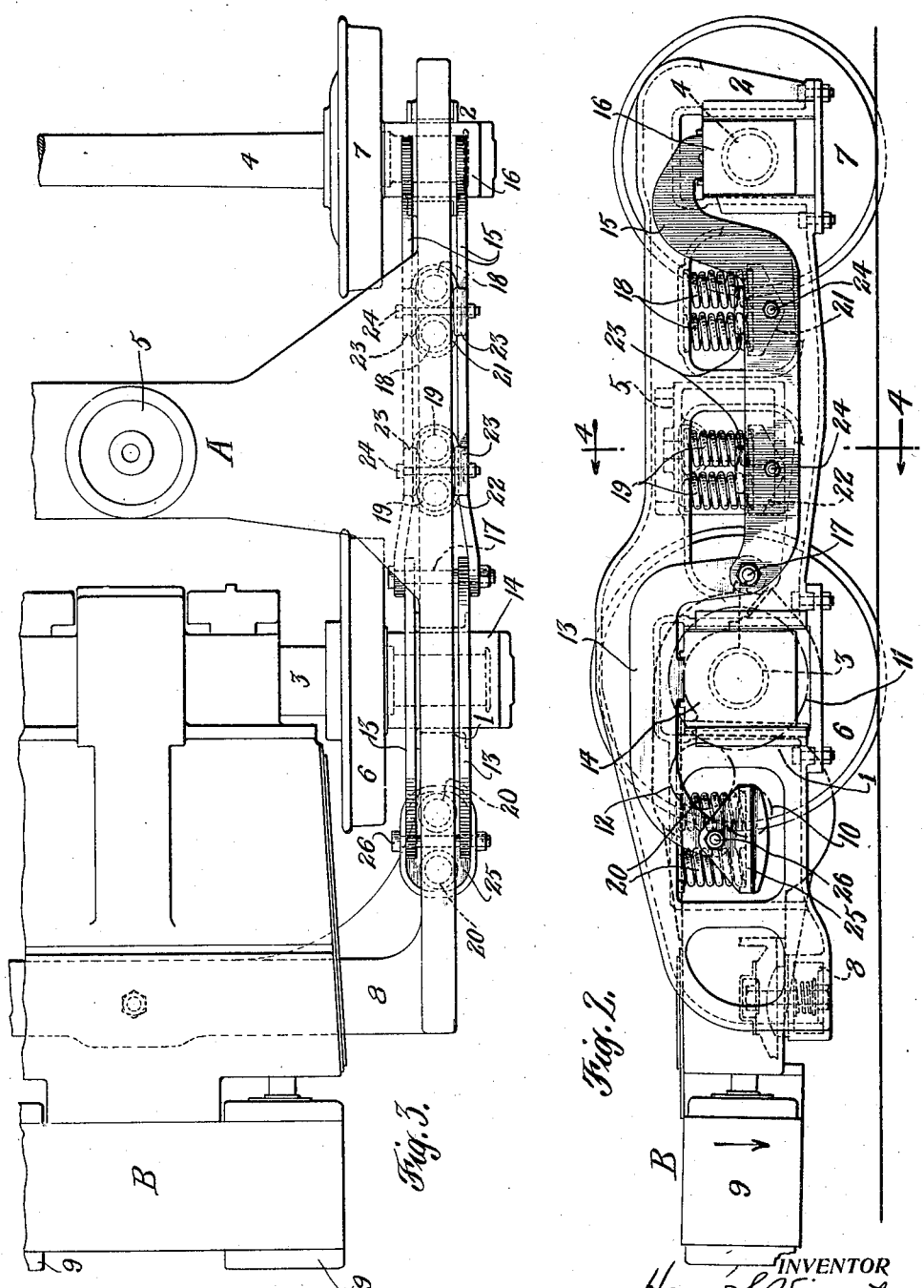
WITNESS  
INVENTOR  
Harry S. Vincent  
BY  
ATTORNEYS Patented July 10, 1928.

1,676,509

UNITED STATES PATENT OFFICE.

HARRY S. VINCENT, OF RIDGEWOOD, NEW JERSEY, ASSIGNOR TO FRANKLIN RAILWAY SUPPLY COMPANY, A CORPORATION OF DELAWARE.

LOCOMOTIVE BOOSTER APPARATUS.

Application filed May 25, 1923. Serial No. 641,288.

This invention relates to an improved booster apparatus for locomotives. Such apparatus as is now well known in the art is intended to aid the locomotive in starting or when negotiating long heavy pulls at slow speeds. Most locomotives are designed so that when starting or at slow speeds there can be produced a considerable excess of steam capacity in the boiler. The booster or auxiliary motors make this excess capacity available at slow speeds of the locomotive. These booster motors are arranged to drive load supporting axles which normally would be idle axles in so far as propelling the locomotive is concerned.

It is the particular object of my invention to provide a novel booster apparatus on a four wheel truck although certain principles might easily be incorporated in a truck having a greater number of wheels than four. I prefer to apply my improved apparatus to the forward truck of a locomotive tender although it will be clearly apparent that it might very well be applied to any truck either on the locomotive or on the tender which has two or more wheel axles.

In connection with the improvement it is my object to provide a truck having two or more wheel axles in which the booster drives but one of the axles with the truck structure and booster arranged with respect to each other in such manner as to throw a greater proportion of the load on the driven axle than on the other axle or axles.

I also aim to reduce the speed at which the booster or auxiliary motor reciprocates and to provide for increased adhesion between the driven wheels and the rails at times when the booster is operating.

These together with such other objects as are incident to my invention or may appear hereinafter I obtain by means of a construction which is illustrated in preferred form in the accompanying drawings, wherein:

Fig. 1 is a side elevation of the rear end of a locomotive with its attached tender on the forward truck of which my improvements have been applied; Fig. 2 is an enlarged side elevation of my improved booster apparatus showing the details of my invention in greater clearness than on Fig. 1; Fig. 3 is a partial plan view of Fig. 2 the entire view not being given for it is a mere duplication of the portion illustrated; and Fig. 4 is a section on the line 4—4 of Fig. 2.

Referring to the drawings it will be seen that the truck frame A is provided with two pairs of pedestal jaws 1 and 2 in which are mounted in the usual way the axles 3 and 4. The center plate 5, as clearly shown in Fig. 3, is located closer to the axle 3 than to the axle 4 so that a greater proportion of the weight which the truck carries is placed upon the wheels 6 of the axle 3 than upon the wheels 7 of the axle 4.

The booster motor B is mounted partly upon axle 3 and partly upon the cross member 8 at the rear of the frame A and is adapted to drive the axle 3.

The booster cylinders 9 operate a driving pinion 10 which is only diagrammatically shown in Figs. 1 and 2 in order to avoid confusion in the illustration. A gear 11, also only diagrammatically illustrated in the figures mentioned, is fixed to the axle 3 and the booster motor may be entrained or disentrained by means of the idler gear 12 which can be moved into or out of engagement with the driven gear 11 but which is always in mesh with the driving pinion 10.

When the booster is operating the driving torque tends to push the whole booster motor B downwardly against the cross member 8 as indicated by the arrow in Fig. 2.

The load of the vehicle supported by the truck is transmitted to the wheels through the frame A and the load distributing mechanism now to be described. A pair of levers 13 straddles the axle 3 at each end thereof and rests thereupon through the medium of the axles boxes 14 in a manner well known to those familiar with this art. Another pair of levers 15 rests at one end upon the axle boxes 16 of the axle 4. The adjacent ends of the levers 13 and 15 are coupled together upon the pivot pins 17.

The load is transmitted from the frame A to the levers 13 and 15 of the weight distributing mechanism through the forward springs 18, the intermediate springs 19 and the rear springs 20. The forward and intermediate springs 18 and 19 rest in cradles 21 and 22 which are provided with horizontally extending lips 23 (see particularly Fig. 4) which are adapted to rest at either side upon the upper edges of the levers 15. The pins 24 are provided to maintain the cradles in proper position. The rear springs 20 rest in a cradle 25 which is hung by means of a pin 26 to the rear end of the lever 13.

We have therefore a lever (13) fulcrumed on the axle box 14 and another lever 15 fulcrumed on the axle box 16 the two levers being connected together at their inner ends. The outer or rear end of the lever 13 receives weight from the frame A and the forward lever 15 receives weight from the frame A at two points which are between the fulcrum and the pivotal connection 17. When the booster is not operating this arrangement distributes a certain fixed amount of the load to either axle.

As is previously pointed out when the booster motor is operating the torque tends to throw it downwardly in the direction of the arrow in Fig. 2 and this force is transmitted through the cradle 25 to the rear end of the lever 13 thus adding a still greater proportion of the load to the driven axle whenever the booster motor is functioning as a driving power.

It will thus be seen that I have provided an extremely efficient booster apparatus on a truck having more than one axle. By providing the driven axle with wheels of a larger diameter than the wheels on the other axle or axles it is possible to reduce the speed at which the booster motor reciprocates when in operation. The entire construction and arrangement is such as to throw a greater proportion of the load upon the driven axle so as to secure greater adhesion between the wheels thereof and the rails. The center of gravity of the booster motor is to the outside of the wheel base of the truck.

I claim:

1. A locomotive booster apparatus comprising in combination a truck frame having a pair of wheel axles, a truck center plate located nearer to one axle than to the other, weight distributing structure comprising pairs of levers pivoted together and carried on the axles, means for transmitting the load from the frame to the axles through said weight distributing structure, and an auxiliary motor adapted to drive the axle which is nearer the center plate and supported in part at least on the frame, the torque of the motor when driving acting through the frame on said distributing structure to increase the load on the driven axle whereby to increase the adhesion between its wheels and the rails.

2. A locomotive booster apparatus comprising in combination, a truck frame having a pair of wheel axles, a truck center plate located nearer to one axle than to the other, wheels of larger diameter on the axle which is nearer the center plate than on the other axle, weight distributing structure, and an auxiliary motor adapted to drive the axle which is nearer the center plate and supported in part at least on the frame, the torque of the motor when driving acting through the frame on said distributing structure to increase the load on the driven axle whereby to increase the adhesion between its wheels and the rails.

3. A locomotive booster apparatus comprising in combination, a truck frame having a pair of wheel axles, a truck center plate located nearer to one axle than to the other, weight distributing structure, and an auxiliary motor adapted to drive the axle which is nearer the center plate and supported in part at least on the frame, the torque of the motor when driving acting through the frame on said distributing structure to increase the load on the driven axle whereby to increase the adhesion between its wheels and the rails.

In testimony whereof, I have hereunto signed my name.

HARRY S. VINCENT.